United States Patent [19]

Stageberg et al.

[11] Patent Number: 5,666,250
[45] Date of Patent: Sep. 9, 1997

[54] THIN FILM MAGNETIC HEADS WITH THIN NICKEL UNDERLAYERS

[75] Inventors: Frank E. Stageberg; Mark S. Miller, both of Edina; Kenneth P. Ash, Chanhassen, all of Minn.

[73] Assignee: Seagate Technology, Inc., Scotts Valley, Calif.

[21] Appl. No.: 190,090

[22] PCT Filed: Nov. 23, 1993

[86] PCT No.: PCT/US93/11571

§ 371 Date: Feb. 1, 1994

§ 102(e) Date: Feb. 1, 1994

[87] PCT Pub. No.: WO95/14991

PCT Pub. Date: Jun. 1, 1995

[51] Int. Cl.$^6$ ................................................. G11B 5/147
[52] U.S. Cl. ................................................. 360/126
[58] Field of Search ........................... 360/122, 126–127

[56] References Cited

U.S. PATENT DOCUMENTS

| 4,103,315 | 7/1978 | Hempstead et al. | 360/110 |
| 5,059,278 | 10/1991 | Cohen et al. | 156/643 |
| 5,141,623 | 8/1992 | Cohen et al. | 205/122 |
| 5,200,056 | 4/1993 | Cohen et al. | 205/122 |
| 5,311,387 | 5/1994 | Mallary | 360/126 |

FOREIGN PATENT DOCUMENTS

| AO 114 076 | 7/1984 | European Pat. Off. |
| A0 301 823 | 2/1989 | European Pat. Off. |
| A0 332 320 | 9/1989 | European Pat. Off. |
| A0 387 143 | 9/1990 | European Pat. Off. |
| A28 33 249 | 2/1980 | Germany |
| WOA8502706 | 6/1985 | WIPO |
| WOA8905505 | 6/1989 | WIPO |

OTHER PUBLICATIONS

IBM Technical Disclosure Bulletin, vol. 35 No. 1B, Jun. 1992.
J. Appl. Phys. 64(3), 1 Aug. 1988, "Magnetic anisotropy in Ni/Fe artificial lattice film".
Patent Abstract of Japan, vol. 8, No. 129, (p–280)(1566), Jun. 15, 1984 re: Japan Publication No. JP59033613, (Fujitsu K.K.) Feb. 23, 1984.

Primary Examiner—John H. Wolff
Attorney, Agent, or Firm—Kinney & Lange, P.A.

[57] ABSTRACT

A thin film head (12) and a method for fabricating the same comprises depositing a first nickel seed layer (37) on a substrate (25), forming a bottom portion (16) of a magnetic core (13) on the first nickel seed layer (37), depositing a second nickel layer (39) and forming a top portion (14) of the magnetic core (13) on the second nickel seed layer (39). The stability of the thin film head (12) while in a relaxed state and its read performance are significantly improved.

14 Claims, 3 Drawing Sheets

THIN FILM MAGNETIC HEADS WITH THIN NICKEL UNDERLAYERS

BACKGROUND OF THE INVENTION

The present invention relates to the fabrication of thin film heads for data storage systems. More particularly, the invention relates to the deposition of a nickel seed layer adjacent to the magnetic core of a thin film magnetic head, to reduce the effects of read instability.

Thin film magnetic read/write heads are used for magnetically reading and writing information on a magnetic storage medium which moves relative to the head, such as a magnetic disc. A thin film magnetic head comprises a pair of "yokes" and "poles" which form the magnetic core of the head. Electrical conductors (or coils) pass between the core and are used for both reading and writing information onto the magnetic storage medium. During a write operation, electrical current is caused to flow through the coils generating a magnetic field in the core. A gap region occupies a small space between two pole tips of the magnetic core. The write current in the coils causes magnetic flux to span the gap region. This magnetic flux is then used to impress a magnetic field upon a storage medium producing a magnetic transition, which is then recorded. During the read operation, the magnetic head and the storage medium also move relative to one another, causing magnetic flux to link through the coils. Electrical signals in the coils may be sensed with electric circuitry which enable the recovery of information stored on the magnetic medium.

In thin film heads, the magnetic core serves as a link between the magnetic flux emanating from the transitions in the recording medium and the coils. In doing so, the magnetization of the core changes to reflect signal flux variations. The changing magnetic state of the core is characterized by either magnetic rotation or domain wall motion. In some cases, excitation of the write signal can cause domain walls in the core to move irreversibly.

During the demagnetization process, (i.e. after the termination of a write current pulse), the core may be left with undesirable domain patterns. More particularly, the core may be unable to relax back to a stable magnetic state. For readback, a stable magnetic state exists when the magnetic domains are oriented in an easy axis direction. Particular domain patterns, such as vertical walls in the pole tip region, are associated with a high degree of magnetic instability during the readback. The inability of a magnetic head to return to a stable relaxed state may be caused by defects such as scratches, local stresses caused by the deposition process, or inhomogeneities in composition of the core material in the head. In any case, if the domain patterns of the head vary significantly from the "desirable" relaxed magnetization state, the performance of the head is compromised.

One way in which the performance of a thin film magnetic head is degraded is by the effects associated with read instability. One effect of read instability is "head wiggle", which is a distortion of the read signal. The distortion primarily appears as noise on the trailing edge of the readback signal.

European Patent Publication No. 0301823 and IBM Technical Disclosure Bulletin, vol. 35, no. 1B, June 1992, pages 457–459, "Laminated Seed Layers for Plated Thin Film Heads and Structures" describes thin film magnetic heads employing Ni-Fe alloy thin films. European Patent Publication No. 0387143 describes a thin film magnetic head employing Ni-Si thin films. The Journal of Applied Physics, vol. 64, no. 1, August 1988, pages 1343–1346, "Magnetic Anisotropy in Ni/Fe Artificial Lattice Films" describes some of the magnetic properties of laminated Ni and Fe composite films and suggests that such laminated films could be used to form a magnetic yoke in a thin film magnetic head. None of these documents addresses the problem of read instability.

The occurrence of head wiggle causes incorrect data to be retrieved from the magnetic medium. The prior art does not adequately compensate for the effects of read instability in both the design and properties of material used in thin film head fabrication. An improved then film head in which the effects of read instability are consistently reduced, would be a significant improvement to the art.

SUMMARY OF THE INVENTION

In a first aspect this invention provides a thin film head/slider assembly comprising:
a substrate;
a base coat deposited on the substrate; and characterised by further comprising:
a first nickel seed layer deposited on the base coat;
a bottom magnetic core piece positioned over and contacting the first nickel layer;
a second nickel seed layer;
a top magnetic core piece positioned over and contacting the second nickel seed layer; and
insulating material deposed between the bottom core piece and the second nickel seed layer, wherein the insulating material contains coils.

In a second aspect this invention provides a thin film head assembly including a substrate, a bottom pole piece, a bottom yoke, a top pole piece, a top yoke, and insulating material between the top pole and yoke and the bottom pole and yoke and enclosing conducting coils, characterised by comprising:

In a third aspect this invention provides a method for making a thin film head assembly characterised by comprising:
depositing a first nickel seed layer on a substrate;
forming a bottom portion of a magnetic core on the first nickel seed layer;
depositing a second nickel seed layer on an insulating layer;
forming a top portion of the magnetic core on the second nickel seed layer, such that the insulating layer lies between the top and bottom portions of the magnetic core.

The present invention relates to the enhanced performance of a thin film head by minimizing the effects of read instability. The invention provides an improved thin film head and a method of fabricating the same. Specifically, each yoke/pole structure that forms the magnetic core is deposited on a pure nickel seed layer. The presence of the nickel seed layer adjacent to the magnetic core structure of the thin film head exerts a magnetic force on the core. This magnetic force pushes the head into a stable read state after a write excitation. The thin film magnetic head with reinforcing nickel seed layers is less likely to experience domain wall "Barkhausen" jumps in the readback. The result is a magnetic head with a significant improvement in read performance.

DETAILED DESCRIPTION OF THE PREFERRED EMBODIMENTS

The present invention is directed to an improved thin film magnetic head and method of fabricating the same. The four main elements of a thin film head, in the order in which they are deposited, are the bottom magnetic yoke/pole, the flux gap material which provides spacing between the yoke/poles, one or more levels of electrical conducting coils interposed within insulation layers and a top magnetic yoke/pole. The present invention is directed to a seed layer comprised of nickel under each magnetic yoke/pole. The magnetic properties of nickel apply a magnetic force on the core which induces, or pushes, the magnetic core to a "desirable" demagnetized state.

Figure 1:
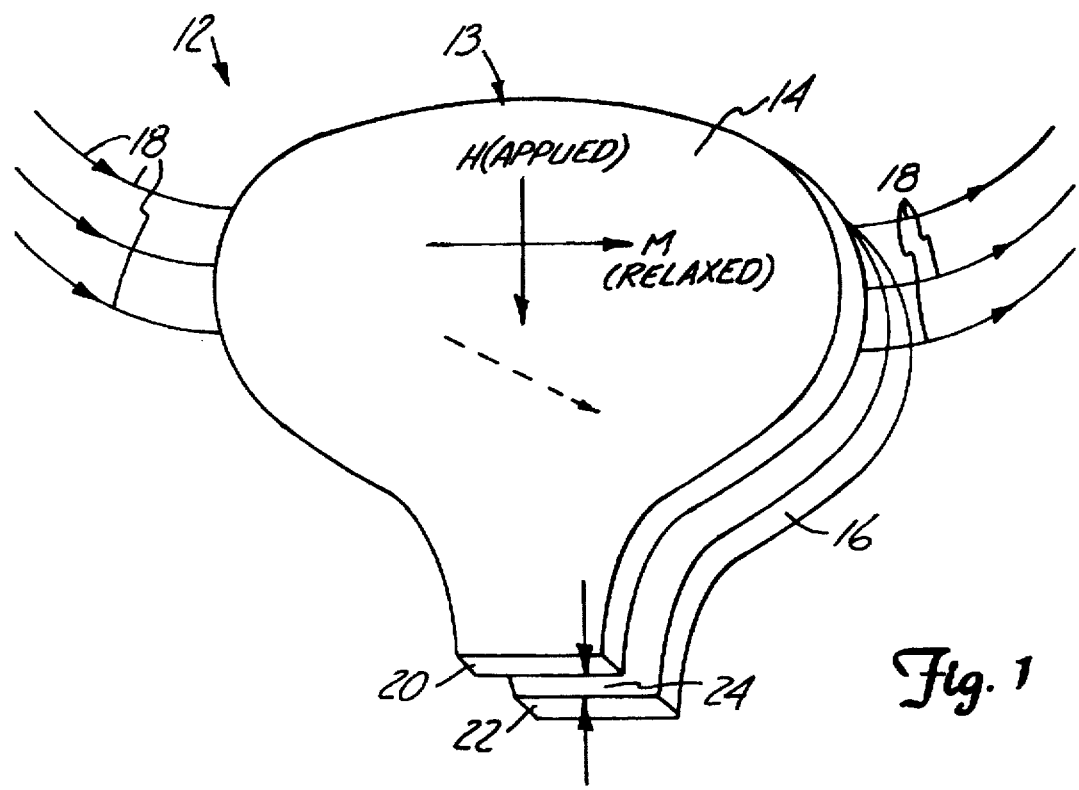
FIG. 1 is a plan view of a thin film magnetic read/write head.

FIG. 1 shows a plan view of thin film head 12 comprising core 13, including upper core piece 14 and lower core piece 16. Coils turns 18 extend through thin film head 12 and are sandwiched between upper core piece 14 and lower core piece 16. Upper core piece 14 includes upper core tip 20, while lower core piece 16 includes lower pole tip 22 (yokes are not shown in this view). Gap 24 is formed between upper pole tip 20 and lower pole tip 22. Typically, alumina ($Al_2O_3$) fills the gap. A magnetic storage medium (not shown) may be placed near gap 24 such that information may be written on or read from the medium.

Also shown in FIG. 1 is an arrow labeled H (Applied) indicating the direction of the applied magnetic field H, and an arrow labeled M (Relaxed) indicating the magnetization vector M of the thin film head 12 in its relaxed state. During operation, a magnetic storage medium, such as a magnetic disc, moves in the region near gap 24 formed between upper pole tip 20 and lower poler tip 22. As electrical current flows in coil turns 18 in the direction indicated, magnetic field H is applied to thin film head 12 in the direction shown by the arrow labeled H (Applied). This applied magnetic field causes magnetization vector M of the pole material to change direction from its easy axis direction, indicated by the arrow labeled M (Relaxed), to the direction indicated by the arrow formed by the dashed line labeled M (Resultant). As vector M (Resultant) is deflected away from the easy axis in the direction toward gap 24 and magnetic field H (Applied), upper pole tip 20 will become an increasingly strong north pole while lower pole tip 22 becomes the south pole. This causes a fringe field (not shown) to form around gap 24 with a magnetic field vector having a direction from upper pole tip 20 to lower tip 22.

In a similar manner, if the current through coil turns 18 were reversed from the direction indicated in the figure, upper pole tip 20 would become a south pole while lower pole tip 22 would become a north pole. This would cause a fringe field around gap 24 with a magnetic field in a direction from lower pole tip 22 to upper pole tip 20. Thus, it is possible by modulating the flow of the electrical current through coil turns 18 to control the magnetization of upper pole tip 20 and lower pole tip 22. Gap 24 emanates a fringe field which extends beyond the region of the gap. When a magnetic storage medium, such as a magnetic disc, is placed in this fringe field information may be recorded by impressing the magnetic field upon the medium. Similarly, magnetization patterns impressed upon a storage medium passing through the fringe field region of thin film head 12 induce an electrical voltage across the coil turns 18, such that the stored information may be retrieved.

When data is not being written onto a magnetic medium, it is desirable for the magnetic domain pattern of thin film head 12 to be in an easy axis orientation, except for the edges. In other words, when there is no magnetic field H being applied to thin film head 12, the magnetization of thin film head 12 should be in its relaxed state, M (Relaxed). Often times, however, thin film heads exhibit an unstable magnetic domain pattern after the termination of a write process.

Figure 2:
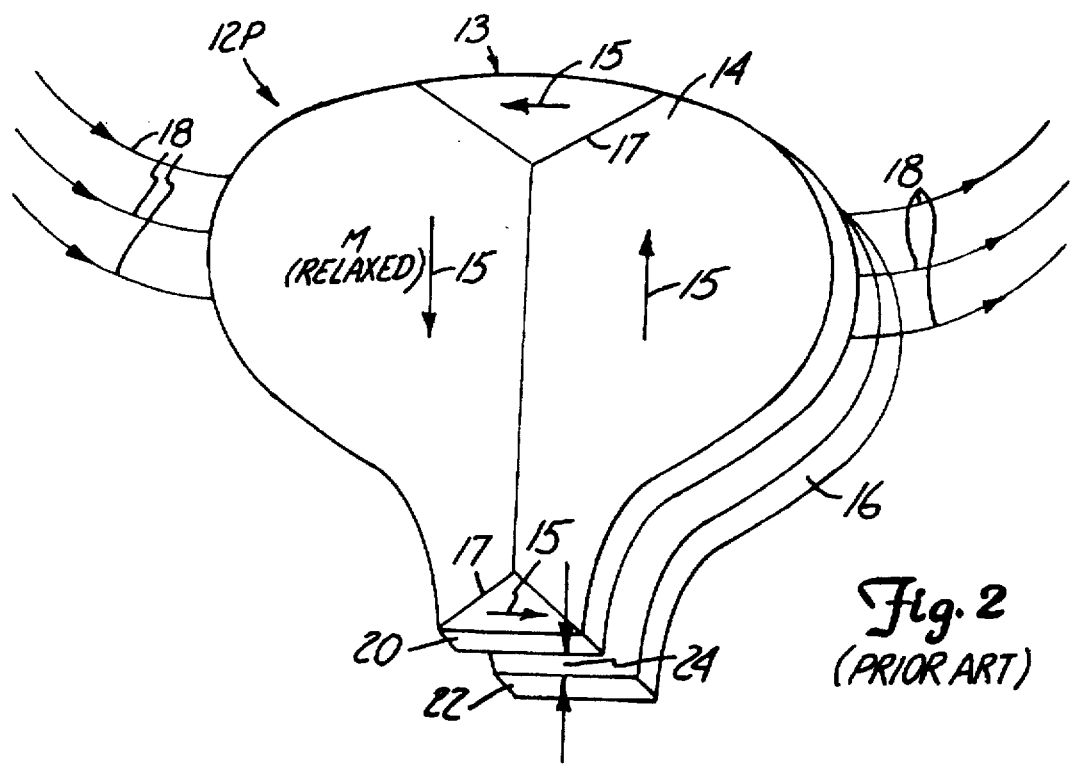
FIG. 2 is a plan view of a prior art thin film magnetic read/write head exhibiting a unstable magnetic domain pattern.

FIG. 2 diagrammatically shows an unstable prior art thin film head 12P. When current passed through coil turns 18, the direction of magnetization in the domains of upper core piece 14 were deflected away from the easy axis (not shown). After the current was terminated, upper core piece 14 did not return to a relaxed magnetic state. Arrows 15 indicate the direction of magnetization vectors in the magnetic domains across upper core piece 14 after the termination of the write current. Lines 17 indicate domain walls which exist after the termination of a write current. Upper core piece 14, as shown in FIG. 2, exhibits vertical domain wall 17A perpendicular to pole tip 20. The presence of domain wall 17A perpendicular to pole tip 20 can cause magnetic read instability. This instability causes head wiggle which significantly degrades readback performance.

Figure 3:
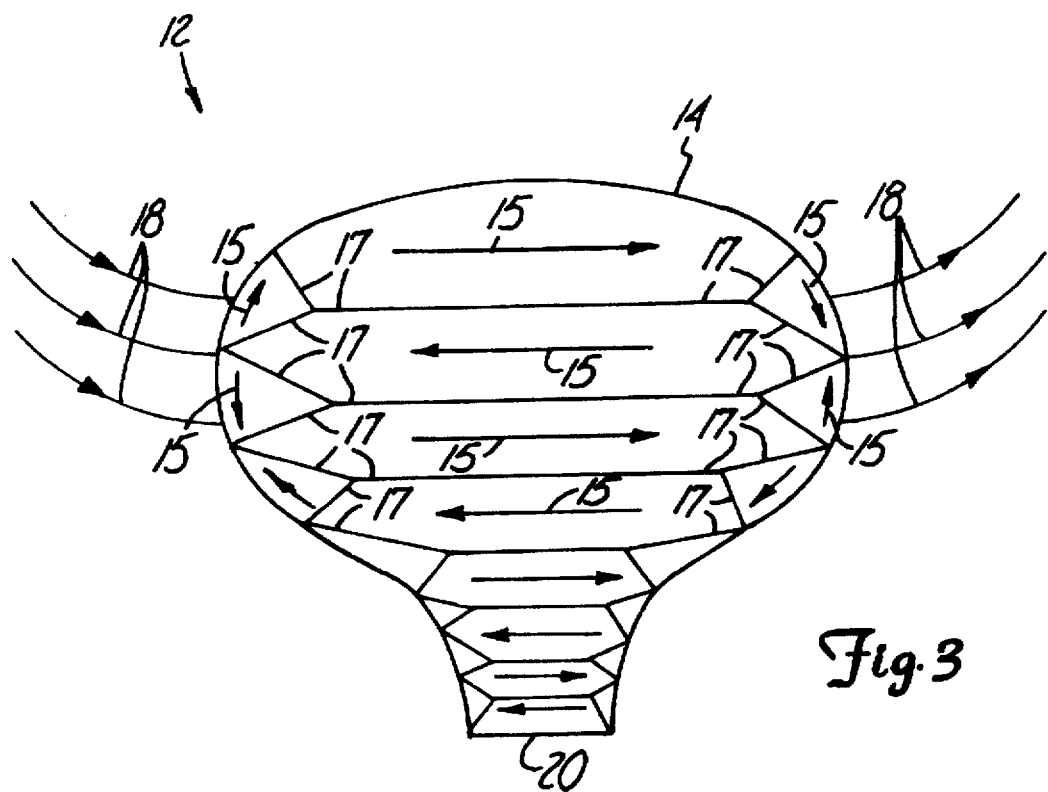
FIG. 3 is a plan view of a thin film magnetic read/write head exhibiting a stable magnetic domain pattern.

FIG. 3 diagrammatically shows a magnetically stable thin film head made in accordance with the present invention. Thin film head 12 is shown including arrows 15 which indicate the direction of magnetization vectors M (Relaxed) in the magnetic domains across upper pole piece 14. Lines 17 show domain walls. Thin film head 12 is shown in its minimum energy relaxed state after removal of the write current. The orientation of the various magnetic domains shown in FIG. 3 is desirable because there are no vertical domain walls in or near pole tip 20. The practical result of a magnetically stable core is less readback noise than that of prior art thin film head 12P shown in FIG. 2.

Figure 4:
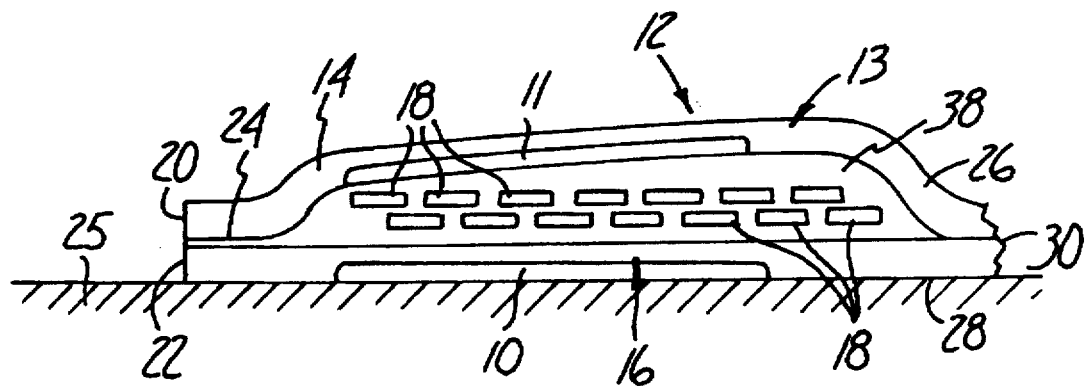
FIG. 4 is a cross-sectional view of a thin film magnetic read/write head made in accordance with the present invention as it appears on a slider.

FIG. 4 shows a cross-sectional view of thin film magnetic head 12 made in accordance with the present invention. Thin film bead 12 includes substrate 25 and core 13. Core 13 comprises upper yoke 11, upper pole piece 14, lower yoke 10 and lower pole piece 16. Upper pole piece 14 and lower pole piece 16 form upper pole tip 20 and lower pole tip 22, between which gap 24 is formed. Core 13 also includes rear upper portion 26 and rear lower portion 28. Upper pole piece 14 and lower pole piece 16 and rear upper and lower portions 26 and 28, respectively, meet at center 30.

Thin film head 12 uses two levels of core windings formed by coils 18. Both levels of coils 18 are wound around center 30 of core 13, with a portion of the winding being sandwiched between core 13. Typically, basecoat 36 is an insulator such as alumina, $Al_2O_3$. The area between core 13 is filled with insulating material 38. Usually, insulating material 38 is photoresist. Gap 24 between upper pole tip 20 and lower pole tip 22 is filled with alumina, $Al_2O_3$. Insulating material 38 is also sandwiched between rear upper and lower portions 26 and 28 of core 13. Core 13 is separated from substrate 25 by basecoat 36 (shown in FIG. 5). The present invention employs a nickel seed layer 37 sandwiched between basecoat 36 and core 13. During fabrication, multiple heads similar to thin film head 12 may be deposited across an entire surface of substrate 25. For the purposes of this example, however, only the fabrication of single thin film magnetic head 12, is shown.

Figure 5:
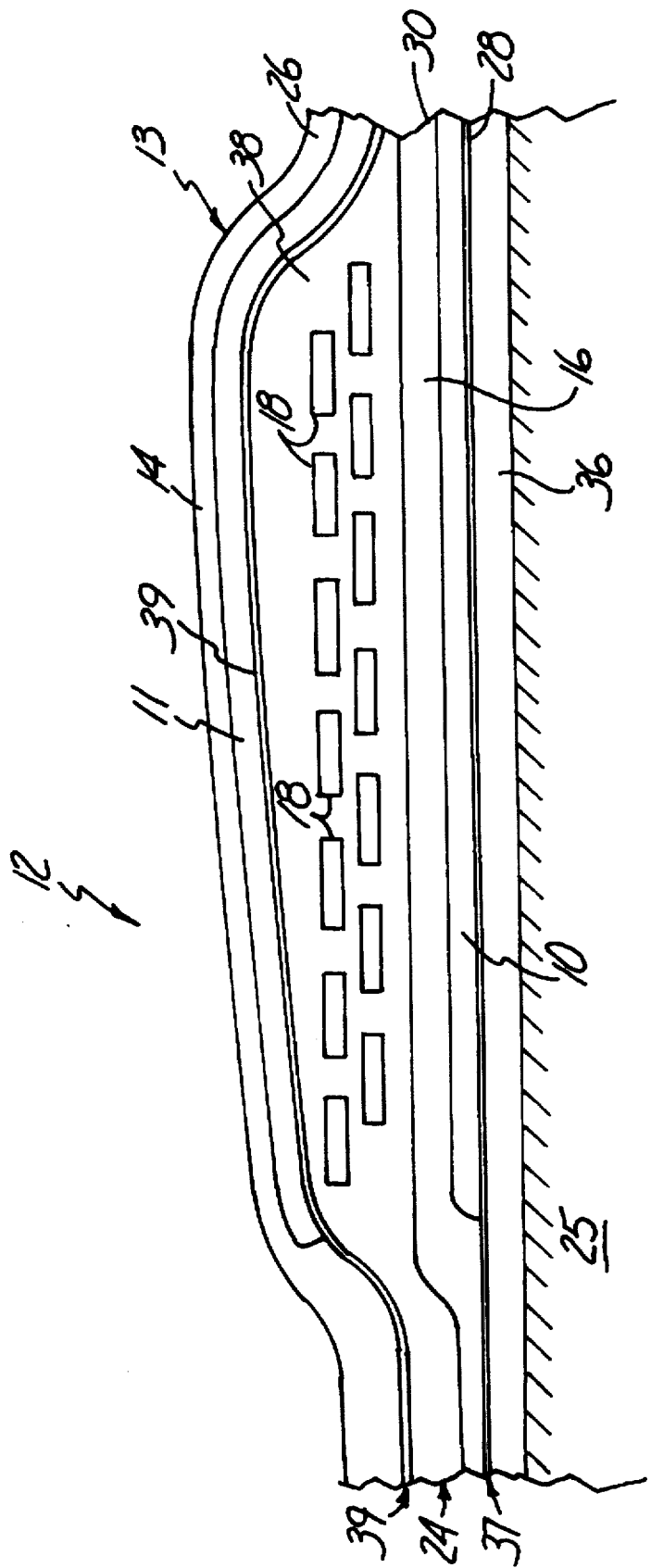
FIG. 5 is a cross-sectional view of the fabrication process of a thin film head made in accordance with the present invention.

FIG. 5 shows the fabrication process which begins with basecoat layer 36 being deposited across the entire surface of substrate 25 of a slider (not shown). Base coat 36 comprises a non-conductive alumina material and is usually applied with sputtering techniques. First nickel seed layer 37 is sandwiched between basecoat 36 and the bottom of magnetic core 13. Layer 37 serves as a foundation for the bottom of magnetic core 13. A thin film layer of magnetic material, such as permalloy, is applied across the surface of nickel seed layer 37. This thin film layer forms the bottom of magnetic core 13 including lower yoke 10, lower pole tip 22, lower rear portion 28 and part of center 30. Using photolithographic techniques, insulating layer 38 is deposited upon the bottom of core 13.

Alumina is deposited in gap 24. Next, coil turns 18 are deposited upon insulating layer 38 and are wound around center 30. Insulating layer 38 is built up to cover coil turns 18. Second nickel seed layer 39 is sandwiched between insulating layer 38 and the top magnetic core 13. Next, another layer of magnetic material, such as permalloy is deposited over the second nickel seed layer to form the top of magnetic core 13 including upper yoke 11, upper pole piece 14, rear upper portion 26 and a portion of center 30. All layers are deposited using either electrodeposition or sputtering techniques.

Tests reveal that thin film magnetic heads made in accordance with the method of the present invention reduces to approximately one half the amount of head wiggle associated with read instability of prior art thin film heads. The pure nickel seed layers 37 and 39 apply a magnetic force on each half of magnetic core 13 such that when in a relaxed state, the domain patterns of the core (i.e. yokes and poles) are pushed toward an easy axis orientation. The method of the present invention is suitable for transducers made of any type of magnetic material. The method may also be used in conjunction with other forms of data storage medium. The present invention results in an efficient, cost effective means to increase the magnetic stability of a transducer.

Although the present invention has been described with reference to preferred embodiments, workers skilled in the art will recognize that changes may be made in form and detail without departing from the spirit and scope of the invention.

We claim:

1. A thin film head/slider assembly comprising:
 a substrate;
 a base coat deposited on the substrate;
 a first seed layer of essentially pure nickel deposited on the base coat;
 a bottom magnetic core piece positioned over and contacting the first seed layer;
 a second of essentially pure nickel seed layer;
 a top magnetic core piece positioned over and contacting the second seed layer; and
 insulating material disposed between the bottom core piece and the second seed layer, wherein the insulating material contains coils.

2. The thin film head of claim 1 wherein the base coat comprises $Al_2O_3$.

3. The thin film head of claim 1 wherein the top and bottom core piece comprise a yoke (10, 11) and pole (14, 16).

4. The thin film head of claim 1 wherein the first and second seed layers are each in contact with a respective magnetic core piece.

5. The thin film head of claim 4 wherein the second seed layer extends along the entire length of the top pole and yoke pieces.

6. A thin film head assembly including a substrate, a bottom pole piece, a bottom yoke, a top pole piece, a top yoke, and insulating material between the top pole and yoke and the bottom pole and yoke and enclosing conducting coils, the improvement comprising:
 a first seed layer of essentially pure nickel sandwiched between the substrate and the bottom pole and yoke pieces; and
 a second seed layer of essentially pure nickel sandwiched between the insulating material and the top pole and yoke pieces.

7. The thin film head of claim 4 wherein the first seed layer extends along an entire length of the bottom pole and yoke pieces.

8. A method for making a thin film head assembly comprising:
 depositing a first layer of essentially pure nickel on a substrate to form a first nickel seed layer;
 forming a bottom portion of a magnetic core on the first nickel seed layer;
 forming an insulating layer over the bottom portion of the magnetic core;
 depositing a second layer of essentially pure nickel on the insulating layer to form a second nickel seed layer; and
 forming a top portion of the magnetic core on the second nickel seed layer, such that the insulating layer lies between the top and bottom portions of the magnetic core.

9. The method of claim 8 wherein depositing the first nickel seed layer comprises sputtering nickel onto the substrate.

10. The method of claim 9 wherein the substrate is a basecoat (36) of a slider.

11. The method of claim 8 wherein depositing the second nickel seed layer comprises sputtering nickel onto the insulating material of the thin film head.

12. The method of claim 8 wherein forming a bottom portion of the core on the first nickel seed layer comprises depositing a permalloy material onto the first nickel seed layer.

13. The method of claim 8 wherein forming the top portion of the core on the second nickel seed layer comprises depositing a permalloy material onto the second nickel seed layer.

14. The method of claim 8 wherein depositing the first and second nickel seed layers results in superior magnetic pole orientation of the bottom and top pole pieces.

* * * * *

UNITED STATES PATENT AND TRADEMARK OFFICE
CERTIFICATE OF CORRECTION

PATENT NO. : 5,666,250
DATED : SEPTEMBER 9, 1997
INVENTOR(S) :
FRANK E. STAGEBERG, MARK S. MILLER, KENNETH P. ASH

It is certified that error appears in the above-indentified patent and that said Letters Patent is hereby corrected as shown below:

Col. 4, line 43, delete "bead", insert --head--

Signed and Sealed this

Ninth Day of June, 1998

Attest:

BRUCE LEHMAN

Attesting Officer

Commissioner of Patents and Trademarks